Patented Nov. 27, 1928.

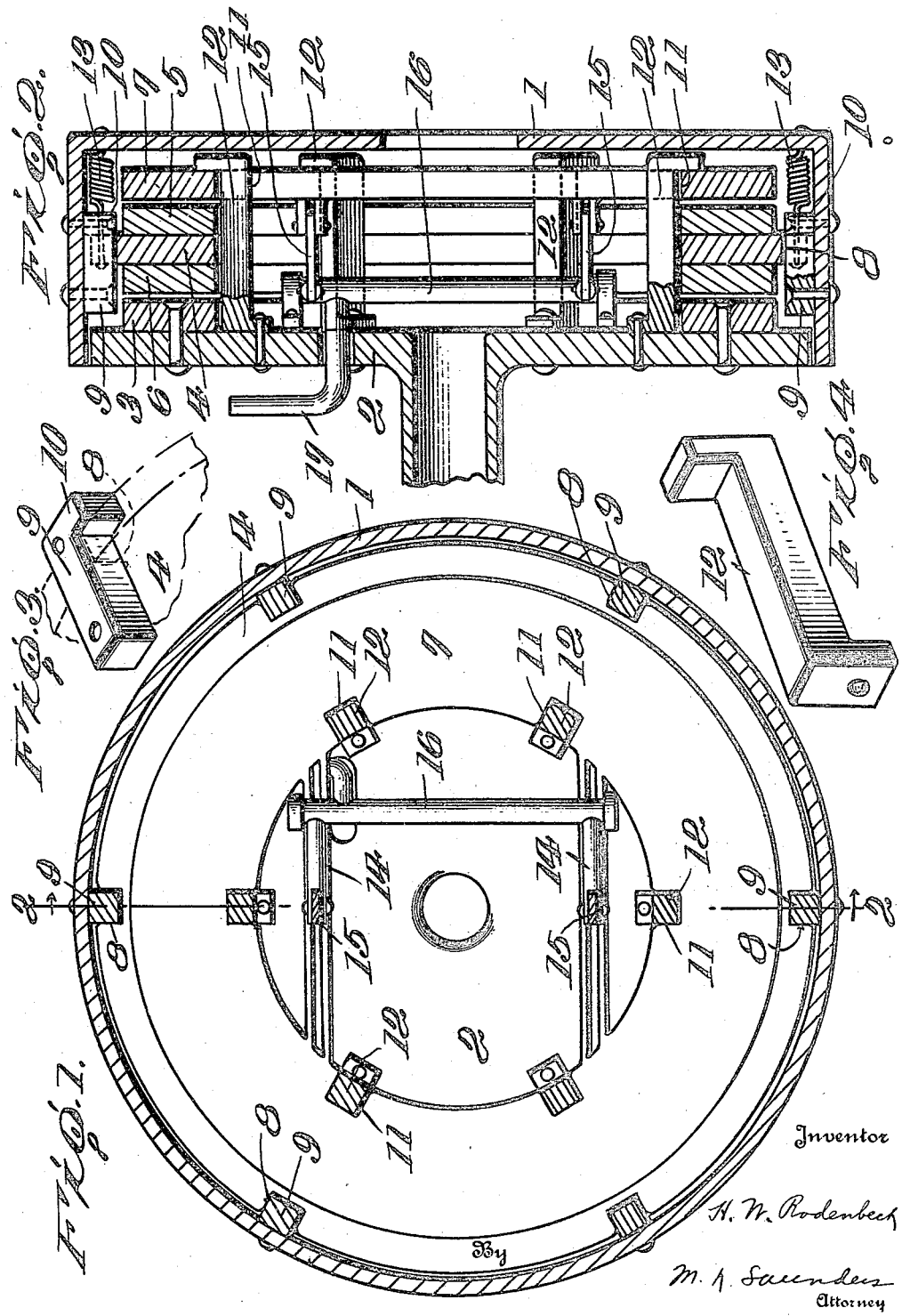

1,693,466

UNITED STATES PATENT OFFICE.

HENRY W. RODENBECK, OF PASADENA, CALIFORNIA.

VEHICLE BRAKE.

Application filed June 24, 1926. Serial No. 118,358

My invention relates to vehicle brakes and the object of my invention is to provide a multiple disk brake for a vehicle wheel having a minimum number of parts which is effective in operation and simple in construction.

Another object of my invention is to provide a multiple disk brake which is contained within a housing on the wheel, the strain of operation being borne entirely by the housing.

A further object of my invention is to mount the multiple disk brake and housing so that the disks may be easily removed from the housing for replacement or repairs.

A further object of my invention is to provide a multiple disk brake in an enclosing housing so that it is fully protected from dirt and injury.

I accomplish the above, and other objects of the invention which will be apparent as the description proceeds, by means of the construction shown in the accompanying drawings, in which Figure 1 is a plan view of my improved vehicle brake and mounting, the brake drum and guide stops being shown in section;

Fig. 2 is a section on the line 2—2 of Fig. 1;

Fig. 3 is a perspective of the guide and stop for the central disk element;

Fig. 4 is a perspective of the guide and stop for the outer disk element.

On the drawings, in which like reference characters indicate like parts on all the figures thereof, 1 indicates the brake drum of usual construction adapted to be fastened to a vehicle wheel and 2 the axle housing. Fastened to the axle housing, as by screws or rivets, is the primary brake disk 3 formed preferably of steel. A compound disk member, comprised of the three elements 4, 5 and 6, is adapted to cooperate with the primary disk 3 in braking the wheel. These disk elements 4, 5 and 6 may be formed of any suitable material, but the major portions of the faces of the outer elements 5 and 6 are provided with brake lining composition. If desired, the brake lining composition may cover the entire faces of the outer disk elements, or the elements may be formed entirely of such brake lining material.

The three elements constituting the compound disk are preferably riveted to each other in order to function as a single member.

Adjacent to the central compound disk, and on the side opposite the disk 3, is a third cooperating brake disk 7 preferably from steel similarly to the primary brake disk 3.

The compound disk is provided with a plurality of cutout portions 8 around its outer periphery, these cutout portions being provided to accommodate guide elements 9. Each guide element 9 is fastened at one extremity to the brake drum and is provided with a stop 10 at its opposite extremity, as shown in Fig. 3, the stops 10 serving to limit the outward movement of the central compound disk.

The disk 7 is provided with several cutout portions 11 on its inner periphery which accommodate the guide and stop elements 12. These guide and stop elements 12 are similar to the guides 9 and are fastened to the axle housing.

Springs 13, attached at one end to the central compound disk and at the opposite end to the brake drum are provided for the purpose of holding the central disk normally against the stops 10 and away from the primary braking disk 3.

The operating means for my improved brake comprises two shaft arms 14 attached by means of connecting links 15 to the disk 7, the shaft arms being operatively connected to the rock shaft 16 which is mounted near its ends in suitable journals.

A pedal lever 17 is suitably located and operatively connected to the rock shaft 16.

The operation of the device is believed to be obvious from the foregoing description and only a short résumé is though necessary. Pressure being applied to the pedal lever 17, the shaft 16 is rocked in its journals, thus drawing the disk 7 against the central compound disk 4, 5 and 6. Further movement of the lever 17 and shaft 16 carries the disk 7 and the compound disk into positive engagement with the primary disk 3, thus braking the wheel.

When the pedal lever is relieved of pressure, the parts will return to their normal position, the springs 13 serving to assist in this return movement. If desired, a spring may be provided for returning the pedal lever 17 to its normal position when relieved of pressure.

It is to be noted that the brake drum and the axle housing form a complete housing for my improved brake, so that the parts are enclosed within the same, thus protecting it from dirt and injury, while permitting easy access thereto for replacement or repair.

It is also to be noted that my improved disk brake is so located that the braking force is always applied in the direction of the axle housing, and not against the wheel, as is usual in disk brakes, and that therefore there is no tendency to force the wheel off during operation thereof.

Having thus described my invention, what I claim as new is, and desire to secure by Letters Patent:—

In a vehicle brake, an axle housing having a braking surface, a brake drum cooperating with said housing to form a brake casing, a friction disc, a braking disc, said friction and said braking discs being rotatably and axially movable within said casing, combined guides and stops for the friction disc secured to the brake drum, combined guides and stops for the braking disc secured to the axle housing, and means for holding said braking and friction discs against said stops when in inoperative position.

In testimony whereof I affix my signature.

HENRY W. RODENBECK.